United States Patent
Gröber et al.

(10) Patent No.: US 6,988,240 B2
(45) Date of Patent: Jan. 17, 2006

(54) METHODS AND APPARATUS FOR LOW OVERHEAD ENHANCEMENT OF WEB PAGE AND MARKUP LANGUAGE PRESENTATIONS

(75) Inventors: Marcus Gröber, Leverkusen (DE); Attila Szepesvary, Budapest (HU); Gergely Szilvasy, King of Prussia, PA (US); Tamas Szvitacs, Nagykovacsi (HU); Alex Zaks, Audubon, PA (US)

(73) Assignee: Global Knowledge, Inc., King of Prussia, PA (US)

( * ) Notice: Subject to any disclaimer, the term of this patent is extended or adjusted under 35 U.S.C. 154(b) by 34 days.

(21) Appl. No.: 10/216,081

(22) Filed: Aug. 9, 2002

(65) Prior Publication Data

US 2004/0034831 A1 Feb. 19, 2004

Related U.S. Application Data

(60) Provisional application No. 60/368,950, filed on Mar. 29, 2002.

(51) Int. Cl.
*G06P 17/00* (2006.01)

(52) U.S. Cl. ...................... 715/501.1; 715/513
(58) Field of Classification Search .............. 715/501.1, 715/513, 526; 345/705, 706, 707, 710, 711
See application file for complete search history.

(56) References Cited

U.S. PATENT DOCUMENTS

| | | | | |
|---|---|---|---|---|
| 5,862,325 A | * | 1/1999 | Reed et al. | 395/200.31 |
| 5,933,140 A | * | 8/1999 | Strahorn et al. | 345/338 |
| 6,185,587 B1 | * | 2/2001 | Bernardo et al. | 707/513 |
| 6,259,445 B1 | * | 7/2001 | Hennum et al. | 345/338 |
| 6,275,227 B1 | * | 8/2001 | DeStefano | 345/339 |
| 6,289,370 B1 | * | 9/2001 | Panarello et al. | 709/200 |
| 6,307,544 B1 | * | 10/2001 | Harding | 345/338 |
| 6,381,610 B1 | * | 4/2002 | Gundewar et al. | 707/104 |
| 6,437,805 B1 | * | 8/2002 | Sojoodi et al. | 345/763 |
| 6,467,081 B2 | * | 10/2002 | Vaidyanathan et al. | 717/123 |
| 6,578,022 B1 | * | 6/2003 | Foulger et al. | 706/45 |
| 2001/0032216 A1 | * | 10/2001 | Duxbury | 707/505 |
| 2001/0034742 A1 | * | 10/2001 | Stinson | 707/501.1 |
| 2002/0091993 A1 | * | 7/2002 | Walley et al. | 717/120 |
| 2002/0130895 A1 | * | 9/2002 | Brandt et al. | 345/708 |
| 2002/0156846 A1 | | 10/2002 | Rawat et al. | |
| 2003/0001875 A1 | * | 1/2003 | Black et al. | 345/708 |
| 2003/0084115 A1 | * | 5/2003 | Wood et al. | 709/217 |

* cited by examiner

*Primary Examiner*—Sanjiv Shah
(74) *Attorney, Agent, or Firm*—David J. Powsner; Nutter McClennen & Fish LLP

(57) ABSTRACT

The present invention provides methods and system for enhancing web page and other markup language presentations. Tags are embedded in the pages identifying aspects of the display subject to enhancement. A "zero footprint" player is provided, as well, for selectively interpreting those tags to present the enhancements.

43 Claims, 4 Drawing Sheets

Figure 3A

Please enter your name, your current residence, and your social security number. This information is used to identify and track your application.

If you are buying a new home, type "New" in this space. If you are refinancing the mortgage on your current home, type "Refin".

PLEASE ENTER:
NAME [JOHN DOE]
CURRENT ADDRESS [123 Main St]
SOCIAL SECURITY NUMBER [111-11-1111]
TYPE OF APPLICATION? [REFIN]

Figure 3B

You cannot enter the property address because you are refinancing your current residence. The address has been filled in for you.

This value cannot be entered because you are refinancing your home. Please enter the current value of your home to determine the amount you are refinancing.

PLEASE ENTER:
PROPERTY ADDRESS [123 Main St]
PRICE [$0]
DOWN PAYMENT [$0]
CURRENT VALUE [$]
YEARS AT RESIDENCE [ ]

Figure 3C

Please enter your place of employment

Please enter your annual salary

Please enter your total monthly payments on any credit cards you have.

PLEASE ENTER:
EMPLOYMENT [ ]
SALARY [$0]
CREDIT [$]

METHODS AND APPARATUS FOR LOW OVERHEAD ENHANCEMENT OF WEB PAGE AND MARKUP LANGUAGE PRESENTATIONS

This application claims the benefit of priority of U.S. Provisional Patent Application Ser. No. 60/368,950, filed Mar. 29, 2002, entitled "Methods and Apparatus for Low Overhead Enhancement of Web Page and Markup Language Presentations," the teachings of which are incorporated herein by reference.

BACKGROUND OF THE INVENTION

The invention pertains to markup language presentation and, particularly, to the enhancement of web page presentations by web browsers. The invention has application (by way of non-limiting example) in facilitating use of web pages, as well as in training aids and accessibility aids, whether delivered over networks or operating on stand-alone computers.

Though the computer was invented over forty years ago, use of the ubiquitous device remains a challenge for most people. Bound paper manuals gave way to on-line help as the computer went mainstream in the early 1980's. Software publishers have since struggled to make context-sensitive help screens that are comprehensive yet simple, thereby meeting the demands of novices and seasoned users alike. Both vendor and client have provided help-desk attendants which provided sources of assistance but at the increased cost, and often inefficient utilization, of staffing resources.

Responding to the needs of sight-impaired users presents a host of additional problems. Basic program screens and help displays may need to be magnified, visually revamped or played in audio. The size of the quality assurance task may, consequently, double.

These problems are further compounded by the decreased use of stand-alone applications and the corresponding increased reliance on remote applications that "execute" via users' web browsers. Solutions to many of the aforementioned problems applicable to local applications often prove inapplicable to remotely executed ones.

An object of this invention is to provide improved methods and apparatus for enhancement of web page and other markup language presentations, e.g., by browsers.

A more particular object is to provide such methods and apparatus as facilitate web page use and as can be applied as software training aids and accessibility aids for Internet- and other computer network-based applications, as well as for stand-alone local software applications.

A further object is to provide such methods and apparatus as can be readily implemented at low cost, and without consumption of undue processor or memory resources.

SUMMARY OF THE INVENTION

The foregoing are among the objects attained by the invention which provides, in one aspect, a method of enhancing presentation of a web page on a browser of the type that generates a display or other presentation on the basis of HTML (or other markup language) elements in the page. The method includes encoding, within the web page, identification (referred to below as a "tag") of at least one selected markup language element the display of which is to be enhanced. The method further includes encoding, within the page, functionality (referred to below as a "player") that enhances presentation of the selected markup language element on a basis of the identification. In a method according to this aspect of the invention, the encoding of the identification of the element to be enhanced is separate from the encoding of the functionality that performs the enhancement.

According to related aspects of the invention, the step of encoding the identification (or "tag") includes encoding an enhancement itself and/or a reference thereto. Encoding the enhancement can include directly encoding help text, graphics or other information to be presented to by the browser in conjunction with the markup language element of interest, optionally, with formatting indicating how the enhancement is to be presented.

Encoding a reference to an enhancement, according to further related aspects of the invention, can include encoding a unique (or non-unique) I.D. for the selected markup language element or the web page on which it resides. The I.D. is associated, for example, with any of help text, graphics and other information that is maintained, for example, in a store (e.g., an XML database) accessible by the player or otherwise by the browser.

Further aspects of the invention provide methods as described above in which the player is encoded in the web page as a script, applet or a control. The script can be, for example, a Visual Basic or JavaScript script. The applet can be a Java applet. The control can be, for example, an ActiveX control. Regardless, a player according to related aspects of the invention is encoded with functionality (e.g., by way of script or programming instructions) to present the help text, graphics or other information associated with the selected markup element or referenced thereby.

Further aspects of the invention provide methods as described above in which the step of encoding the identification of the markup element includes encoding a non-conventional attribute in an otherwise conventional markup language element. A conventional markup element is an element specified, for example, in a standard such as that promulgated by the World Wide Web ($W^3$) consortium or other standards association. A non-conventional attribute is, for example, one that does not interfere with browser processing of a conventional element in which it (the non-conventional attribute) is included and, preferably, which is parsed by the browser for inclusion in the internal representation of the page (i.e., the document object model or DOM), yet, is not otherwise interpreted by the browser.

Yet still further aspects of the invention provide methods of enhancing presentation of a web page through inclusion of a player as described above. Further related aspects provide methods of operating such a player.

Further aspects of the invention provide methods for enhanced web page presentation in which a web page described above is presented by a web browser executing on a digital data processor. The player, executing as an applet, a control or a separate executable module, is automatically or selectively actuated and, thereafter, monitors elements identified, e.g., by way of the aforementioned encoded identifications. When a user takes action with respect to such an element (sometimes referred to below as a "user interface object"), the player modifies the web page presentation in accord with the enhancement associated with the element. According to related aspects of the invention, the player can modify the web page presentation under a variey of other circumstances, e.g., highlighting a user interface object that the user is to next act upon, highlighting all elements on a page which the user is to act upon, generating a pop-up display indicating a sequence of elements to act upon, and so forth.

In related aspects of the invention, enhancement can include emphasizing (by color, typefont, graphics or otherwise) the user interface object. In further related aspects, the player modifies the presentation to include audio or audio-visual components, all as specified directly or indirectly by the encoded identification. In still other related aspects of the invention, the player enhances the presentation by executing a script or effecting a state machine, e.g., providing wizard-like operation.

These and other aspects of the invention are evident in the drawings and in the text that follows.

BRIEF DESCRIPTION OF THE ILLUSTRATED EMBODIMENT

A more complete understanding of the invention may be attained by reference to the drawings, in which:

FIGS. 3A–3C depict enhanced displays and other features presented by the player of FIGS. 1 and 2.

DETAILED DESCRIPTION OF THE ILLUSTRATED EMBODIMENT

Figure 1:
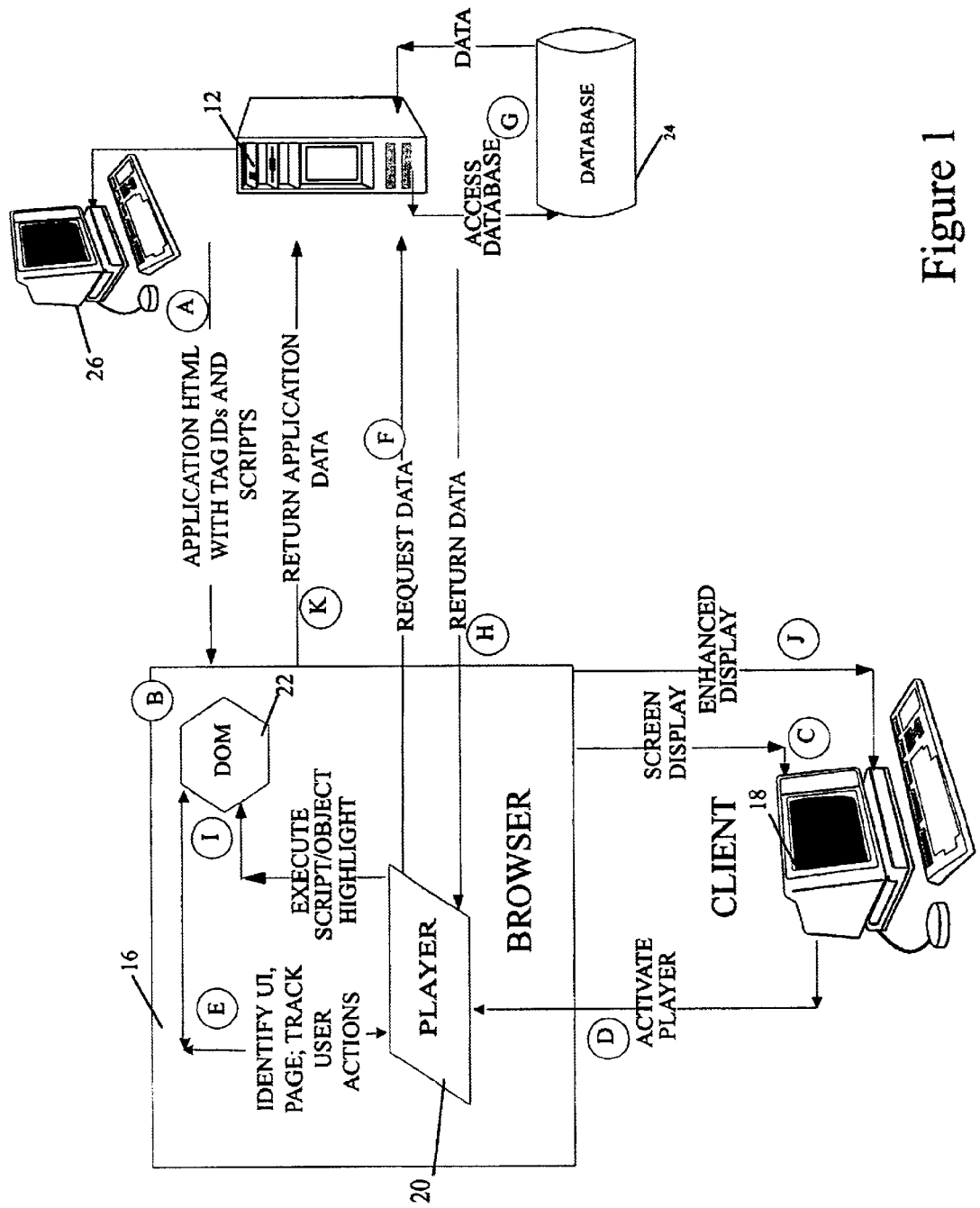
FIG. 1 depicts a digital data processing system according to the invention wherein a digital server system uploads a web page containing tags identifying markup language elements to be enhanced.

FIG. 1 depicts a digital data processing system, according to one practice of the invention, comprising a server 12 and a client computer 18 coupled via an intranet, extranet, Internet or other network or communications medium that supports HTTP or other communications consistent with the teachings below and otherwise in the conventional manner known in the art. A web browser 16 operates within the client 18 (or is otherwise in conjunction therewith) and is in communication coupling with server 12, also in the conventional manner known in the art.

The server and client computers may be of the conventional type known in the art that serve and access HTML pages, respectively. The server 12 may, for example, be a mainframe computer, workstation or other digital data processing apparatus suitable for serving web pages. In addition to disk drives (not shown) that store the pages themselves, the server may have an associated database 24 that contains text, graphics, scripts or other information for enhancing web page presentation, as discussed below. The client computer 18 may, for example, be a personal computer or other digital data processing apparatus providing a platform suitable for executing a browser that accesses for display or other presentation, e.g., audio, tactile or otherwise (collectively, "display" or "presentation") the web pages. The server 12, client 18 and web browser 16 operate in the conventional manner known in the art as modified in accord with the teachings below to enhance web page display. Browser 16 represents a conventional web browser of the type commercially available, e.g., under tradenames Internet Explorer™, Netscape Navigator, Mozilla, and so forth. More generally, the term browser refers to software or other functionality suitable for presenting markup language documents.

Though the illustrated embodiment utilizes a networked client-server configuration, those skilled in the art will appreciate that the invention can be practiced in other digital data processing configurations. Non-limiting examples include a stand-alone computer, e.g., with a browser that accesses web pages stored on hard disk, DVD, CD, handheld device or other medium. Moreover, though the illustrated embodiment is intended to facilitate web page presentation with respect to HTML web pages, those skilled in the art will appreciate that the teachings herein can be applied to displays or other presentations of other markup languages, as well, e.g., DHTML, XML, to name a few.

The illustrated embodiment enhances web page presentation through use of (i) web pages that include non-conventional, HTML-like attributes or "tags" that are placed in conjunction with conventional HTML elements whose presentation is to be enhanced, and (ii) a script, program, other software or functionality (collectively, "player") that enhances the browser presentation of the conventional HTML elements based on the tags. The conventional HTML elements may correspond to any aspect of the web page presentation that is to be enhanced though, in typical embodiments, these are elements that cause the browser to present information to the user and/or accept user input. In addition to elements specified by the World Wide Web ($W^3$) consortium and other standards bodies, the conventional HTML elements include applet, object, ShockWave-Flash™, QuickTime™, RealAudio™, SVG and other known extensions.

The tags may take the general form of conventional HTML attributes, though with labels not used under currently-known HTML standards. The tags may be substantially self-contained insofar as they contain text, graphics, or other information from which alone the player 20 can enhance the web page presentation. Such is the case, for example, of tags that contain simple help text, perhaps, along with directives specifying how that text is to be displayed. Upon invocation (e.g., in response to a user help request), the player can present that text in connection with the conventional HTML element with which it is used. Alternatively, or in addition, the tags may provide (indirect) reference to text, graphics, or other information with which the presentation is to be enhanced. Thus, for example, a tag may provide an I.D. (associated with an HTML element or a web page) or other identifying information which can be used, for example, by the player to look up and/or request from the server 12 (or other source) information from which the presentation can be enhanced.

The term "tag" as used herein refers to attributes (whether conventional or non-conventional) in conventional HTML elements, which attributes are used by the player as direct or indirect identifiers of enhancements that are to be made in the web page presentation. In some embodiments, the tags may comprise entire HTML elements and not merely attributes. In any event, however, "tag" refers to attributes (or elements) used by the player for web page presentation enhancement in accord with the teachings herein and should not be confused with the more conventional use of the word "tag" merely as a synonym for HTML element.

Preferred tags are those which do not affect browser presentation of the web pages' conventional HTML elements. Still more preferably, such tags are of a form that are (i) parsed by the browser for inclusion in a document object model ("DOM") in conjunction with the conventional HTML elements with which those tags are placed, yet, (ii) are not otherwise interpreted by the browser.

Instead of, or in addition to, using tags to identify HTML elements of the web page that are to be enhanced, some embodiments of the invention include functions, tables, stores, lists, controls or other invocable or addressable mechanisms to identify such HTML elements. For example, according to one preferred practice, web pages that are to be enhanced in accord with the invention include a JavaScript function that, when invoked, returns a list of identifiers for the HTML elements to be enhanced. Such a function, which can obviate the use of tags, may include a "hard-coded" list of identifiers or may effect a database or table look-up to identify such identifiers. Provided with the list, the player can then search the HTML document or DOM to find the HTML elements to be enhanced.

Tags or their substitutes (as discussed in the immediately preceding paragraph) can be encoded within a web page in a variety of ways. One is through hand-coding. Another is through use of functionality which monitors exemplary uses of the web page and allows an operator to identify HTML elements to be enhanced. Such functionality can record the operator's input in response to such elements, recording text, graphics, or other information to be displayed to an end-user in response to his or her help or other requests. A preferred general example of such a methodology (albeit, not one applied in the context of web page presentation enhancement) is that utilized in the developer module of the product OnDemand Personal Navigator™, commercially available from the assignee hereof. In conjunction with either the hand-coding or recorder-based techniques, a grammar-based methodology can be used to identify UIs for enhancement. Such a methodology is disclosed in commonly owned U.S. patent application Ser. No. 09/925,613, filed Aug. 9, 2001 titled "Methods and Apparatus for Grammer-Based Recognition of User-Interface Objects in HTML Application," incorporated herein by reference.

With further reference to FIG. 1, there is depicted, by way of non-limiting example, an embodiment of the invention used to enhance a conventional form-based web page to include wizard-like text messages, dialog boxes and so forth to guide a user through the form.

At the outset, the server 12 "serves" or otherwise uploads HTML data streams or web pages over a network or other remote communications device. See, step A. This can be an intranet, extranet, Internet or other network that supports HTML applications, as noted above. The HTML streams or web pages can represent fill-in forms (e.g., a mortgage application as will be described herein), a simple display (e.g., a map or instruction sheet), a combination of the foregoing (e.g., a catalog), or a program, such as a server-based word processor, database system, or any other "application" capable of operating in a client-server and other web-based environment.

As noted above, a web page downloaded by the server contains conventional HTML elements, as well as tags of the type described above. In addition, the web page can include JavaScript, VisualBasic, activeX, XSLT or other controls or other functionality embodying the above noted player 20—though, in other embodiments the player 20 is implemented as a stand-alone executable (e.g., that runs "along side" the browser) or browser-resident module of the type commonly referred to as a plug-in.

In preferred embodiments, the player is a "zero-footprint" application (e.g., a small application that does not require pre-installation) that includes relatively little native code (or script) but, rather, that relies on information encoded within the tags, or in databases or other stores to which the tags refer, in order to enhance the web page presentation. While a generic player can potentially be used with all web pages (or at least all web pages that abide by the same tagging scheme), the player can also be customized for use with specific web pages or portions thereof. One such player implementation is presented in the Appendix attached hereto.

Turning now to the client browser 16, per convention it receives the HTML from the server 12 and parses it to generate the document object model, or DOM 22. See, step B. This is an internal representation of the web page, which the browser 16 uses to generate a presentation on client computer 18. It includes representations of the conventional HTML elements contained in the web page, as well as tags embedded therein. As suggested above, the browser typically parses such non-conventional tags and places them in the DOM, along with the representation of the conventional HTML elements, in which they are contained. However, the browser does not otherwise process those tags.

The player does, however. In the illustrated embodiment, it accesses the DOM to identify the tags and enhances the presentation based thereon. This can be accomplished via generation of further HTML or via direct modification of the DOM.

Regardless, enhancements effected by the player can include highlighting UI objects on the client computer 18 console, filling-in fields, selecting radio buttons, setting sliders, and the like—all based on text, graphics and/or formatting information directly encoded within the tags or referenced thereby. For sight-impaired users, the enhancements can also include, by way of non-limiting example, magnifying or enhancing the contrast of UI objects, generating synthesized speech, and so forth—again, based on information encoded within the tags or referenced thereby.

Instead of, or in addition to, text, graphics and formatting information, the tags can include directly encoded or indirectly referenced scripts. These can be JavaScripts, Visual-Basic scripts, and so forth, that are directly executable within the virtual machine environment established by the browser or, alternatively, they can be pseudo code, state tables or other intermediate forms that are interpreted by the player itself. Regardless of their form, these "scripts" can manipulate UI field contents, e.g., causing the player to blank out certain fields, highlight others in sequence, substitute a fill-in field with a combo-box or, more generally, subsitute an original UI with a different UI of similar purpose, thereby, aiding the users's understanding of the web page. Other examples are scripts that effect wizard-like operation, effectively, automating the web page operation for the user—e.g., filling in some UIs based on others' values, copying values from some UIs to others in exact or augmented form, skipping unnecessary UIs, presenting pop-ups, tables and dialog boxes and so forth to ease user understanding or use of the page.

Still other examples are scripts that establish a live link, preferably, via a browser window, between the user and an automated or live "help desk" attendant. In establishing the link, the script can cause the player to transmit relevant web page state information, as well as client computer information, web page HTML code, and screen captures to the attendant. The script can also facilitate direct implementation of changes suggested by the attendant. Thus, for example, if the attendant suggests that a UI presented by the browser be filled in with a specific value, the script can cause the player 20 to fill the suggested value in on the user's behalf.

In other embodiments, the scripts can cause the player to generate or confirm values for "cookies" maintained on the client computer 18. Use of the scripts and player in this regard, can reduce the need for information transfer between the client and server, e.g., insofar as the player acts as an agent for the server in establishing potentially proprietary or otherwise sensitive cookie values.

Whether effected by the player from directly or indirectly encoded text, graphics, scripts or other information, the enhancements appear as an integral part of web page from the user perspective. Nonetheless, they may be developed and implemented separately from the original web page development effort. This can speed implementation of the web page, since the persons involved with it can work independently of those who author tags, scripts and so forth for use by the player in enhancing web page presentation.

In step C, the browser 16 displays or otherwise presents the web page, e.g., text, pictures, video, hyperlinks and other output, while accepting text, user selections and other input, all in the conventional manner. The client user can activate the player 20, e.g., by selecting an option in the client display, clicking an icon, or other method. See, step D. Alternatively, the player 20 can be activated automatically upon download of the web page.

Referring to step E, when the player 20 is activated it accesses the DOM 22 to determine which conventional HTML element the user has currently selected or is near (e.g., as in the case of a pointer that is hovering over a button or other UI object), if any. The player also traverses the DOM to determine whether there are any tags associated with that HTML element.

If the tag for the identified element contains a text, graphic or other information for use in enhancing the presentation, the player uses that information accordingly. This can be by direct modification of the DOM though, preferably, it is by generation of further HTML for display by the browser in the conventional manner. If the tag includes an I.D. (unique or otherwise) of the HTML element (or of associated enhancement text, graphics, scripts, etc.), the player 20 looks to an auxiliary store for the enhancement information. In the illustrated embodiment, this is by way of a request to XML or other database maintained on server 12 or by another digital data processor (including client computer 18, itself). See, step F. In other embodiments, it is by reference to a function, table or other invocable or addressable mechanism maintained in the web page or elsewise.

Referring to step G, in the illustrated embodiment, the request by the browser 16 to the server 12 includes a UI identifier and/or HTML page identifier. The server 12 uses this to fetch or obtain text, graphics, scripts or other presentation enhancement information from data base 24. See, step G. The enhancement is communicated back to the player 20 (or, alternatively, directly to the browser 16). See, step H. The player 20, in turn, generates HTML reflecting the enhancement or modifies the DOM 22 accordingly. See, step 1. The web page presentation is thereby enhanced. See, step J. In the event that the enhancements downloaded from the server, e.g., in step H, include "scripts" as noted above, the player 20 executes those in order to provide further web page enhancement which ends, e.g., at script termination or upon user request. In some embodiments of the invention, the web page may include JavaScript, VisualBasic, or other scripts or controls that interact with an API of player 20 to cause it to start, stop or perform a specific action. Conversely, the player 20 may take action based on the web pages' specific state.

When the user has completed the web page or portion thereof, information collected in UI fields is communicated to the server 12 in the normal course, e.g., via HTTP directives.

The teaching above can be further understood via a simplified example of the illustrated embodiment depicted in FIG. 2 and FIGS. 3A–3C. Of course, as can be appreciated by one with ordinary skill in the art, a typical web page can be more complex that shown in the example.

Figure 2A:
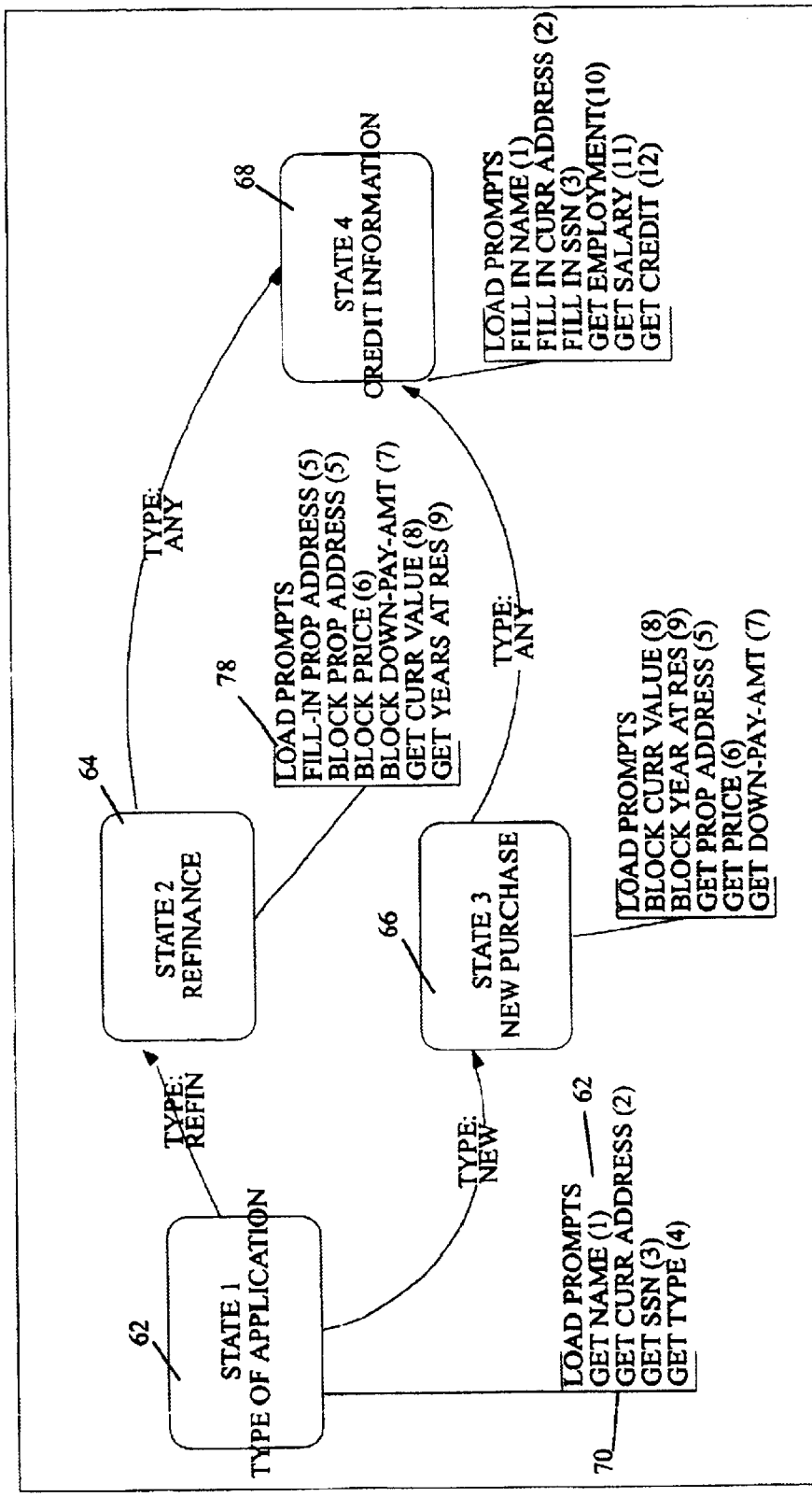
FIG. 2 is a non-limiting example of one embodiment of the invention wherein a player utilizes a state-table to facilitate enhancement of a web page.
Figure 2B:
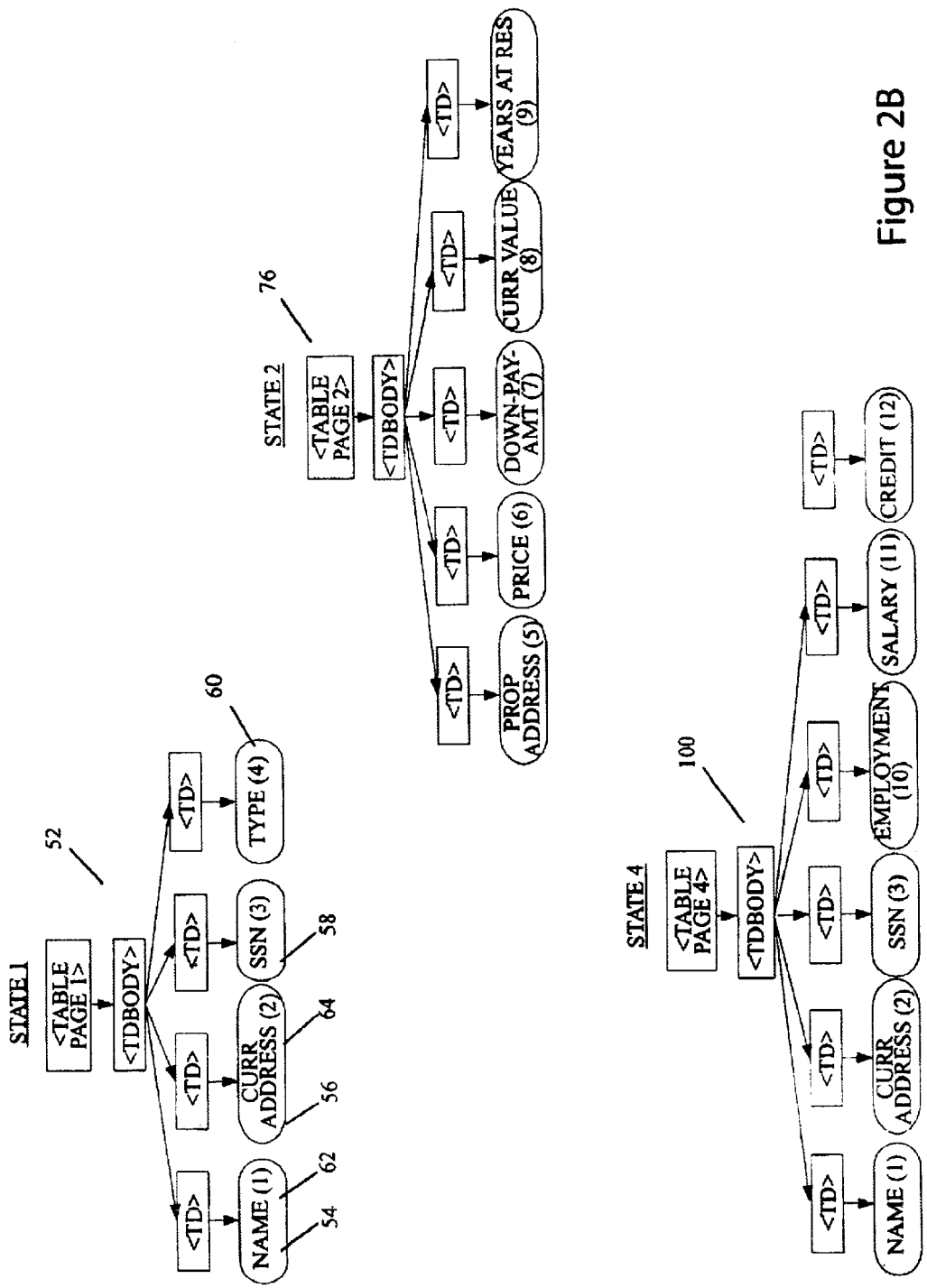

Referring now to FIG. 2, an example of the illustrated embodiment using a state-table script 50 is presented. In this example, the script is designed to aid a client user in entering information into a simplified mortgage loan application. Therefore, it should be recognized by one skilled in the art that this example is but one of many possible implementations. In fact, the methods presented herein are suitable for many common user programs including, by way of non-limiting example, word processors, database systems, business enterprise systems, static web site pages, and any others requiring client user actions.

A user initiates download of an HTML web page in any of a number of common ways. The browser 16 creates the DOM 22 as described above. Here, that DOM is identified as element 52 representing the first HTML page of the loan application, is a directed graph indicating that there are four UIs: name 54, current address 56, social security number 58 and type of loan desired 60. Each of these UIs has an embedded tag, for example, name 54 has a tag with the value of "1" 62; address has a tag with the value of "2" 64, and so on. In this example the tags have only an integer value, although the tags can be more complex, e.g., containing embedded scripts, displayable attributes and the like.

The client user, in this example, activates the player 20 at this point, although the client user could pick any other point throughout the execution of the web pages. Here, the player identifies the current UIs being displayed via the DOM and sends a request to the server for enhancement information for those UIs. The server accesses the database and returns a state table 50 and instructions for displaying "pop-up" text explaining the UIs for the client user.

Each of the four states shown 62 through 68, has a set of "rules." For example, in state-1 62, the rules 70, here denoted using "pseudo code" for ease of understanding, instruct the player to load displayable prompts (e.g., text for use in pop-up text boxes) and to get information from client user input UIs. The rules can contain JavaScript or other browser executable instructions, and can also contain information such as attributes, points to scripts, and the like as described above. Contained within the rules are the tag identifiers (e.g., element 62) relating to the UIs.

The rules 70 are processed by the player, resulting in a client display as indicated in FIG. 3A. These rules 70 are used to modify the presentation as shown in FIG. 3A. As can be seen in the illustration, two pop-up text boxes 84a and 84b are displayed corresponding to UIs name 54 (FIG. 2) and type 60. Further, both UIs are displayed in an enhanced mode 82a, 82b.

Continuing the example, here the client user is applying for a refinance mortgage, hence, "REFIN" is entered in the corresponding UI 82b in accordance with the displayed pop-up text 84b. This information is returned to the server but also is returned to the state machine script 50 via the player.

At this point, the server accepts the input, and downloads the HTML for a second web document and the browser in turn creates the corresponding DOM 76. This document requests the client user to input additional information concerning the property location and attendant financial information. The web page, at this point, has made no differentiation based on the type of loan application requested by the client user, but has rather, downloaded a generic screen corresponding to the application HTML.

The state table, however, transitions from state-1 62 to state-2 64 based on the value "REFIN" in the UI "Type." In state-2 64, a corresponding set of rules 78 is also present. As before, the rules require for the loading and displaying of certain prompts. Additionally, because the type of mortgage is a refinance, the property address is the same as the current address, hence the rules automate this entry by automatically filling in the value for property address as indicated within the rules 78.

Referring to FIG. 3B, the prompts 86a, 86b are displayed informing the client user that the property address and price are not required for a refinance. Further, according to the rules 78 for state-2 64, "prop address" and "price" are blocked, meaning that any entry in those UI will not be accepted. The rules have automated this process by filling the property address with the value in "current address" automatically.

When the client user has completed the entries for this second document, the information is returned to the server which uploads a third HTML document where in turn, the browser creates a corresponding DOM 100. Here, the state table transitions to state-4 68 regardless of the type of loan application because the information is applicable to either a "new" or "refinance" loan type. Again, the server returns further information concerning state-4 68, the browser updates the DOM 100, and the display is updated (FIG. 3C) according to the DOM 100 and the rules for state-4 68.

Methods and system according to the invention have a variety of uses. In addition to enhancing presentation of static web pages, business and other applications programs that are presented via web pages, and so forth, those methods and systems can be used to improve web page accessibility, e.g., to the blind or otherwise impaired. They can also be used for purposes of web page testing, for example, by automically exercising the web page (e.g., using the player and the embedded tags) and/or by guiding human testers through the web page to perform test sequnces. Moreover, they can be used to present the web pages to end users in alternate languages. Thus, for example, the player can be used to present the text on a web page in an alternate language and/or it can be used to present prompts that instruct the user in the alternate language. It will also be appreciated that methods and systems according to the invention provide enhanced security, since they can provide for web page enhancement solely from "inside," e.g., without the use of executables external to the page and/or browser itself.

Of course, this example has been simplified to allow one skilled in the art to recognize the principles and methods behind the illustrated embodiment. Those skilled in the art will appreciate that various modifications can be made to these embodiments without departing from the scope of the present invention. These principles and methods can be more complex, encompassing extended automation scripts, video, audio and the like. In other embodiments, these methods can be used for database management and retrieval, front-end processors for complex data entry, and pre-processing information for multiple server applications, to name only a few. These methods and techniques can be used with a variety of markup languages in addition to HTML.

Therefore, in view of the above, what we claim is:

1. A method of enhancing presentation of a web page on a browser of the type that generates a presentation as a function of markup language elements on the page, the method comprising encoding within the web page, identification of at least one selected markup language element or web page the presentation of which is to be enhanced, wherein the identification comprises a non-conventional attribute within a conventional markup language element, where the conventional markup element is an element of the form specified by a standards organization for use with a browser, and where the non-conventional attribute is an attribute of a conventional element which attribute any of (i) does not interfere with browser processing of the conventional element in which the non-conventional attribute is included, (ii) is parsed by the browser for inclusion in the internal representation of the document, and (iii) is not otherwise interpreted by the browser, encoding, within the web page, separate from the encoding of said identification, a player that locates the identification within the web page and that enhances presentation of the selected markup language element or web page on a basis of the identification.

2. The method of claim 1, wherein the step of encoding the identification includes encoding any of an enhancement and a reference to such an enhancement.

3. The method of claim 2, wherein the step of encoding the identification includes encoding, as the enhancement, any of help text, graphics and other information to be presented by the browser.

4. The method of claim 3, wherein the step of encoding the player includes encoding functionality that enhances the browser presentation by presentation of help text, graphics or other information encoded as the enhancement.

5. The method of claim 3, wherein the step of encoding the identification includes encoding formatting for use in presenting the help text, graphics or other information.

6. The method of claim 5, wherein the step of encoding the player includes encoding functionality that enhances the browser presentation by presentation of help text, graphics or other information encoded as the enhancement in accord with the formatting.

7. The method of claim 2, wherein the step of encoding the identification includes encoding, as a reference to the enhancement, an I.D. for the selected markup language element or web page.

8. The method of claim 7, wherein the step of encoding the player includes encoding functionality that enhances the browser presentation by presentation of information associated with the I.D.

9. The method of claim 7, wherein the I.D. is associated with any of help text, graphics and other information that is to be presented by the browser and that is maintained separately from the encoding of the identification.

10. The method of claim 9, wherein the step of encoding the player includes encoding functionality that enhances the browser presentation by presentation of the help text, graphics or other information associated with the I.D.

11. The method of claim 9, wherein the I.D. corresponds to any of help text, graphics and other information that is any of encoded in the web page separately from the identification and maintained in a store accessible by any of the player and browser.

12. The method of claim 11, wherein the step of encoding the player includes encoding functionality that access the help text, graphics or other information associated with the I.D. from the store.

13. The method of claim 1, comprising encoding the player as any of a script, applet and a control.

14. A method of enhancing presentation of a markup language document on a browser of the type that generates a presentation as a function of markup language elements in the document, the method comprising encoding within the markup language document, any of a function, table, store, list, control and other invocable or addressable mechanism that identifies at least one selected markup language element or web page the presentation of which is to be enhanced, the encoded identifier comprising a non-conventional attribute within a conventional markup language element, where the conventional markup element is an element of the form specified by a standards organization for use with a browser, and where the non-conventional attribute is an attribute of a conventional element which attribute any of (i) does not interfere with browser processing of the conventional element in which the non-conventional attribute is included, (ii) is parsed by the browser for inclusion in the internal representation of the document, and (iii) is not otherwise interpreted by the browser, and encoding, within the web page, separate from the encoding of said identification, a player that locates the identification within the web page and that enhances presentation of the selected markup language element or web page on a basis of the identification.

15. A method of enhancing presentation of a markup language document on a browser of the type that generates a presentation as a function of markup language elements in the document, the method comprising encoding within the markup language document, identification of at least one selected markup language element or web page the presentation of which is to be enhanced, wherein the identification comprises a non-conventional attribute within a conventional markup language element, where the conventional markup element is an element of the form specified by a standards organization for use with a browser, and where the non-conventional attribute is an attribute of a conventional element which attribute any of (i) does not interfere with browser processing of the conventional element in which the non-conventional attribute is included, (ii) is parsed by the browser for inclusion in the internal representation of the document, and (iii) is not otherwise interpreted by the browser, and encoding, within the web page, separate from the encoding of said identification, a player that locates the identification within the web page and that enhances presentation of the selected markup language element or web page on a basis of the identification.

16. The method of claim 15, wherein the step of encoding the identification includes encoding any of an enhancement and a reference to such an enhancement.

17. The method of claim 16, wherein the step of encoding the identification includes encoding, as the enhancement, any of help text, graphics and other information to be presented by the browser.

18. The method of claim 17, wherein the step of encoding the identification includes encoding formatting for use in presenting the help text, graphics or other information.

19. The method of claim 16, wherein the step of encoding the identification includes encoding, as a reference to the enhancement, an I.D. for the selected markup language element or web page.

20. The method of claim 19, wherein the I.D. is associated with any of help text, graphics and other information that is to be presented by the browser and that is maintained separately from the encoding of the identification.

21. The method of claim 20, wherein the I.D. corresponds to any of help text, graphics and other information that is any of (i) encoded in the markup language document separately from the identification and (ii) maintained in a store accessible by any of the player and browser.

22. A method of enhancing presentation of a web page on a browser of the type that generates a presentation as a function of markup language elements on the page, the method comprising encoding within the web page, identification of at least one selected markup language element or web page the presentation of which is to be enhanced, the encoded identification comprises a non-conventional attribute within a conventional markup language element, where the conventional markup element is an element of the form specified by a standards organization for use with a browser, and where the non-conventional attribute is an attribute of a conventional element which attribute any of (i) does not interfere with browser processing of the conventional element in which the non-conventional attribute is included, (ii) is parsed by the browser for inclusion in the internal representation of the document, and (iii) is not otherwise interpreted by the browser, executing that web page within that browser, using a player, encoded on the web page separately from the identification to monitor a response from a user corresponding to the selected markup language elements or pages, enhancing the presentation of those selected markup language elements or pages according to predetermined actions.

23. The method of claim 22, wherein the web page comprises a markup language supporting markup language elements that are presented by the browser.

24. The method of claim 23, wherein the web page comprises HTML.

25. The method of claim 22, wherein the step of enhancing those selected markup language elements or pages further comprise presenting those selected elements or pages in a format other than the format that would have been utilized by the web page absent the enhancement.

26. The method of claim 25, wherein those enhancements provide means for presenting those selected markup language elements or pages in a format such that a sight-impaired person can respond to it.

27. The method of claim 25, wherein those enhancements provide means for presenting those selected markup language elements or pages in a language other than that in which they were originally encoded in the web page.

28. The method of claim 25, wherein those enhancements provide means for presenting a content of one or more markup language elements or pages in a language other than that in which it was originally encoded.

29. The method of claim 22, wherein the step of enhancing the presentation further comprises presenting an audio-visual presentation.

30. The method of claim 22, wherein the step of enhancing the presentation further comprises coupling the browser with a help-desk attendant which receives messages from the user and responds to those messages.

31. The method of claim 30, further wherein the help-desk attendant is any of help-desk personnel and an automated attendant.

32. A method of enhancing presentation of a web page on a browser of the type that generates a presentation as a function of markup language elements on the page, the method comprising:

executing recorder functionality for identifying selected markup language elements or pages and encoding in the web page one or more identifiers for those selected elements or pages the presentation of which is to be enhanced, the identifiers comprise a non-conventional attribute within a conventional markup language element, where the conventional markup element is an element of the form specified by a standards organization for use with a browser, and where the non-conventional attribute is an attribute of a conventional element which attribute any of (i) does not interfere with browser processing of the conventional element in which the non-conventional attribute is included, (ii) is parsed by the browser for inclusion in the internal representation of the document, and (iii) is not otherwise interpreted by the browser, executing that web page within that browser, using a player, encoded on the web page separately from the identification to monitor a response from a user corresponding to those selected markup language elements or pages, using the player to enhance the presentation of those selected markup language elements or pages according to predetermined actions.

33. The method of claim 32, wherein executing a recorder functionality further comprises monitoring execution of the web page and detecting said selected elements or pages during the execution.

34. The method of claim 33, wherein detecting said selected elements or pages further comprises selectively encoding identifiers corresponding to said detected elements, that selection performed by an operator of said recorder functionality.

35. The method of claim 34, further comprising encoding enhancement formatting corresponding to those selected elements or pages.

36. The method of claim 32, wherein encoding those enhancement formatting further comprises encoding those enhancement formats in any of the web page and a data store.

37. The method of claim 36, wherein that data store is located on a server coupled with a client executing said browser.

38. The method of claim 36, wherein that data store is located on a client executing said browser.

39. In a digital system of the type that executes a browser which accepts markup language web pages containing HTML elements and creates a document object model corresponding to those elements, the improvement comprising:

a browser executing said web pages, those web pages containing non-conventional tags identifying HTML elements or pages to be enhanced according to an enhancing format stored in any of the web page and a data store, said browser creating a document object model representative of said web pages, where each non-conventional tags is an attribute of a conventional HTLM element which attribute any of (i) does not interfere with browser processing of the conventional element in which it (the non-conventional attribute) is included, (ii) is parsed by the browser for inclusion in the internal representation of the document, and (ii) is not otherwise interpreted by the browser, and where the conventional markup element is an element of the form specified by a standards organization for use with a browser, a player coupled with that document object model, the player locating those tags identifying those elements to be enhanced, that player further in communication with a data store containing at least enhancing formats relating to those identified elements or pages, the player selectively accessing that data store and retrieving those enhancing formats in response to locating an identified element or web page to be enhanced, the player modifying said document object model according to said enhancing format, the browser presenting the element or web page according to the enhanced format instead of the original format within the web pages.

40. The improvement of claim 39, wherein those identifying tags are encoded within those web pages by functionality operated before those web pages are executed by said browser.

41. The improvement of claim 39, wherein those enhancing formats are stored by a recorder program operated before those web pages are executed by said browser, those enhancing formats stored in any of the web pages and the data store.

42. The improvement of claim 41, further wherein the identifiers comprise tags, those tags further comprising predetermined executable actions.

43. The improvement of claim 39, further wherein the player identifies user object interfaces via identifiers encoded within the application.

* * * * *